(12) United States Patent
Choi et al.

(10) Patent No.: US 11,380,285 B2
(45) Date of Patent: Jul. 5, 2022

(54) ELECTRONIC DEVICE FOR CONTROLLING BRIGHTNESS OF DISPLAY

(71) Applicant: Samsung Electronics Co., Ltd., Gyeonggi-do (KR)

(72) Inventors: Heejun Choi, Gyeonggi-do (KR); Jongjin Kim, Gyeonggi-do (KR); Oheon Kwon, Gyeonggi-do (KR); Seongmin Je, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/793,805

(22) Filed: Feb. 18, 2020

(65) Prior Publication Data
US 2020/0265799 A1     Aug. 20, 2020

(30) Foreign Application Priority Data

Feb. 19, 2019  (KR) .................. 10-2019-0019090
Dec. 19, 2019  (KR) .................. 10-2019-0170441

(51) Int. Cl.
*G09G 5/10* (2006.01)
*G06F 1/16* (2006.01)
(Continued)

(52) U.S. Cl.
CPC .............. *G09G 5/10* (2013.01); *G01B 7/30* (2013.01); *G06F 1/1626* (2013.01);
(Continued)

(58) Field of Classification Search
CPC ............ G09G 5/10; G09G 2320/0626; G09G 2380/02; G06F 1/1626; G06F 1/1652;
(Continued)

(56) References Cited

U.S. PATENT DOCUMENTS

2011/0249042 A1   10/2011   Yamamoto et al.
2013/0181960 A1   7/2013    Kim et al.
(Continued)

FOREIGN PATENT DOCUMENTS

JP   2010-122414   6/2010
JP   2013-007827   1/2013
(Continued)

OTHER PUBLICATIONS

International Search Report dated Jun. 4, 2020 issued in counterpart application No. PCT/KR2020/002330, 10 pages.

*Primary Examiner* — Amare Mengistu
*Assistant Examiner* — Jennifer L Zubajlo
(74) *Attorney, Agent, or Firm* — The Farrell Law Firm, P.C.

(57) ABSTRACT

According to various embodiments, a method of operating an electronic device, which has a foldable housing that causes first and second portions of a display to face each other in a folded state and to be directed in the same direction in an unfolded state and an illuminance sensor that is disposed on a surface on which the second portion is formed, includes a process of determining an angle formed by the first portion and the second portion using data received from an angle detecting sensor; a process of checking out a reference value corresponding to the determined angle in a lookup table; a process of correcting a first illuminance value from the illuminance sensor using the checked reference value; and a process of controlling brightness of the display based on the corrected first illuminance value at least in part.

8 Claims, 14 Drawing Sheets

(51) Int. Cl.
*G09F 9/30* (2006.01)
*G01B 7/30* (2006.01)
(52) U.S. Cl.
CPC ............ *G06F 1/1652* (2013.01); *G09F 9/301* (2013.01); *G09G 2320/0626* (2013.01); *G09G 2360/141* (2013.01); *G09G 2360/144* (2013.01); *G09G 2380/02* (2013.01)
(58) Field of Classification Search
CPC .... G09F 9/301; G01B 7/30; G06G 2360/141; G06G 2360/144
See application file for complete search history.

(56) References Cited

U.S. PATENT DOCUMENTS

| | | | |
|---|---|---|---|
| 2014/0306985 A1* | 10/2014 | Jeong | G09G 3/035 345/600 |
| 2014/0375219 A1* | 12/2014 | Lee | G09G 3/20 315/153 |
| 2018/0082632 A1* | 3/2018 | Lee | G09G 3/3233 |
| 2020/0380909 A1* | 12/2020 | Matoba | G09G 5/14 |

FOREIGN PATENT DOCUMENTS

| | | | |
|---|---|---|---|
| JP | 2013007827 A | * | 1/2013 |
| JP | 5780848 | | 7/2015 |
| KR | 10-0689458 | | 3/2007 |
| KR | 10-1859567 | | 7/2013 |
| KR | 1020140147253 | | 12/2014 |

\* cited by examiner

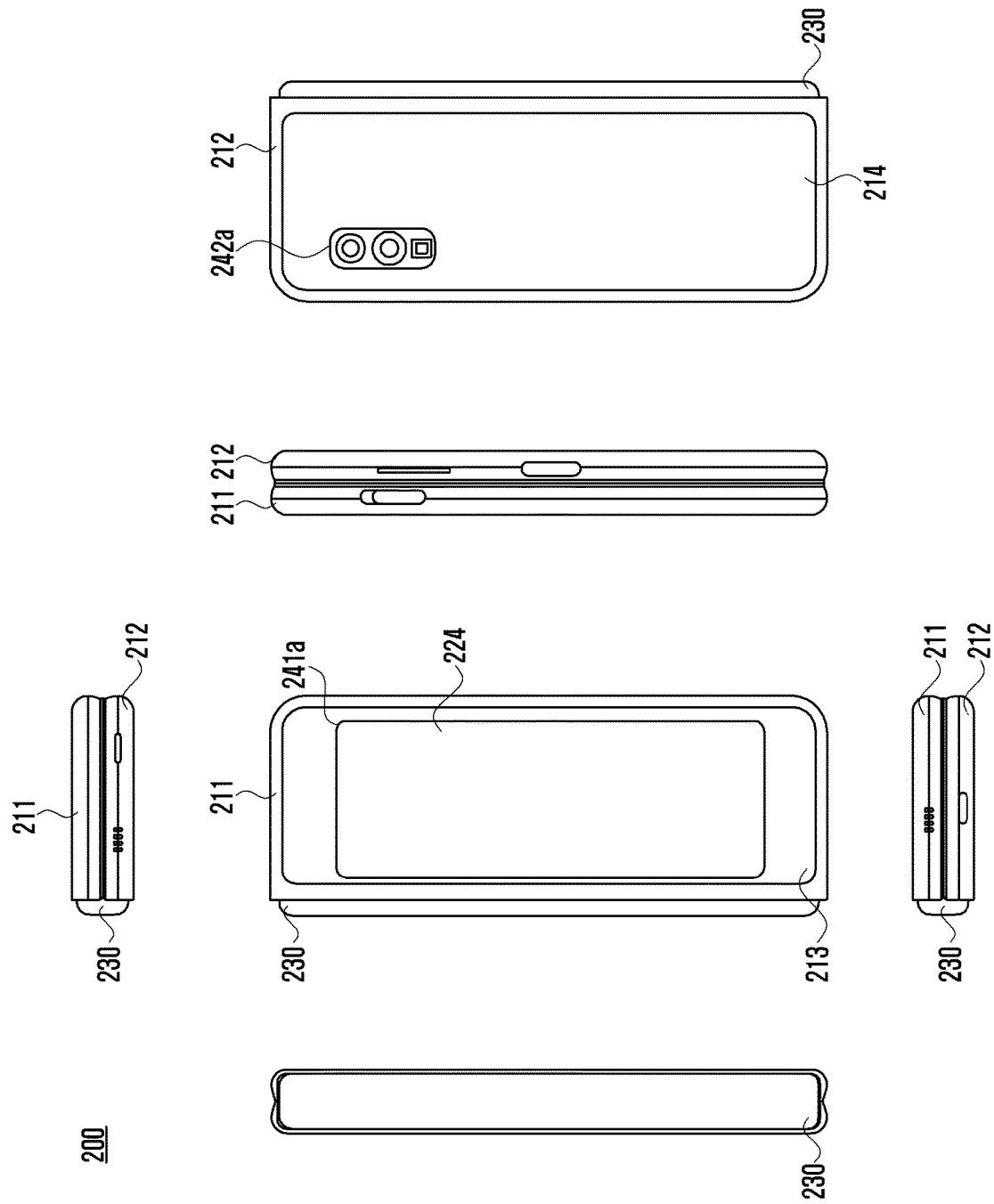

ELECTRONIC DEVICE FOR CONTROLLING BRIGHTNESS OF DISPLAY

CROSS-REFERENCE TO RELATED APPLICATION(S)

This application is based on and claims priority under 35 U.S.C. § 119 to Korean Patent Application Nos. 10-2019-0019090 and 10-2019-0170441, which were filed in the Korean Intellectual Property Office on Feb. 19, 2019 and Dec. 19, 2019, respectively, the entire disclosure of each of which is incorporated herein by reference.

BACKGROUND

1. Field

The disclosure relates generally to an electronic device that has a flexible or foldable display and an illuminance sensor, and more particularly, to an electronic device that is configured to control brightness of a display using an illuminance value measured by an illuminance sensor.

2. Description of Related Art

An electronic device may have a folding axis and a housing that can be folded or unfolded with respect to the folding axis. The housing may be divided into two housing structures with respect to the folding axis. A first portion and a second portion of a display may be formed in the housing structures, respectively. The first portion and the second portion may face each other in a folded state.

The electronic device may include an illuminance sensor, and may control brightness of a screen according to an ambient illuminance based on an illuminance value measured by the illuminance sensor. For example, the electronic device may dim the screen in a dim environment, and may brighten the screen in a relatively bright environment.

The illuminance sensor of the electronic device may be disposed on a surface on which the first portion or the second portion of the display is formed. When the illuminance sensor of the electronic device measures brightness around the electronic device, light emitted from the portion of the display which is formed on the opposite side of the illuminance sensor may actually be received by the illuminance sensor. Thus, the illuminance sensor may erroneously measure the brightness around the electronic device, and an error in control of the screen brightness may occur. For example, the illuminance sensor may erroneously recognize the dim environment as the bright environment due to an influence of the light emitted from the display in spite of the dim environment in actuality, and this erroneous recognition may cause excessive screen brightness, unnecessary power consumption, and eyestrain for a user.

SUMMARY

The disclosure is provided to address at least the problems and/or disadvantages described above and to provide at least the advantages described below.

Accordingly, an aspect of the disclosure is to provide an electronic device that controls brightness of a display based on an angle formed by a first portion and a second portion of the display, and can thereby prevent control of the display caused by erroneously recognizing brightness around the electronic device.

In accordance with an aspect of the disclosure, an electronic device is provided, which includes a housing including a first section and a second section coupled to each other such that an angle formed between the first section and the second section is adjustable; a flexible display at least partially housed in the first section and the second section; a first sensor that generates first data used to identify the angle; a second sensor that generates second data used to identify illuminance around the mobile communication device; and a processor operatively connected to the first sensor and the second sensor, and configured to identify the angle formed between the first section and the second section based on the first data obtained from the first sensor, identify the illuminance based on the second data obtained from the second sensor while at least a part of the flexible display is activated, operate the flexible display at a first brightness in response to the identified illuminance being within a first range corresponding to the angle, wherein the first brightness is based on the identified illuminance, and operate the flexible display at a second brightness, which is dimmer than the first brightness, in response to the identified illuminance being within a second range corresponding to the angle, wherein the second brightness is based on the identified illuminance and the angle.

In accordance with another aspect of the disclosure, a foldable mobile terminal apparatus is provided, which includes a first section; a second section coupled to the first section, movable between a folded state and a unfolded state; a flexible display coupled to the first section and the second section; a light sensor; and a processor configured to identify a plurality of partially folded states when the foldable mobile terminal apparatus is moved from the folded state to the unfolded state, and control a brightness level of the flexible display based on an amount of light sensed by the light sensor and according to an identified partially folded state among the plurality of partially folded states. The light sensor is disposed at the second section and faces an inner side of the first section having the flexible display, when the foldable mobile terminal apparatus is in the folded state.

In accordance with another aspect of the disclosure, a method is provided for operating an electronic device, which includes a foldable housing in which first and second portions of a display face each other in a folded state and are directed in the same direction in an unfolded state. The method includes determining an angle formed by the first portion and the second portion using data received from an angle detecting sensor; determining a reference value corresponding to the determined angle in a lookup table; correcting a first illuminance value from the illuminance sensor using the checked reference value, the illuminance sensor being disposed on a surface on which the second portion of the display is formed; and controlling brightness of the display based on the corrected first illuminance value.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2B illustrates a folded state of the electronic device of FIG. 2A;

DETAILED DESCRIPTION

Figure 1:
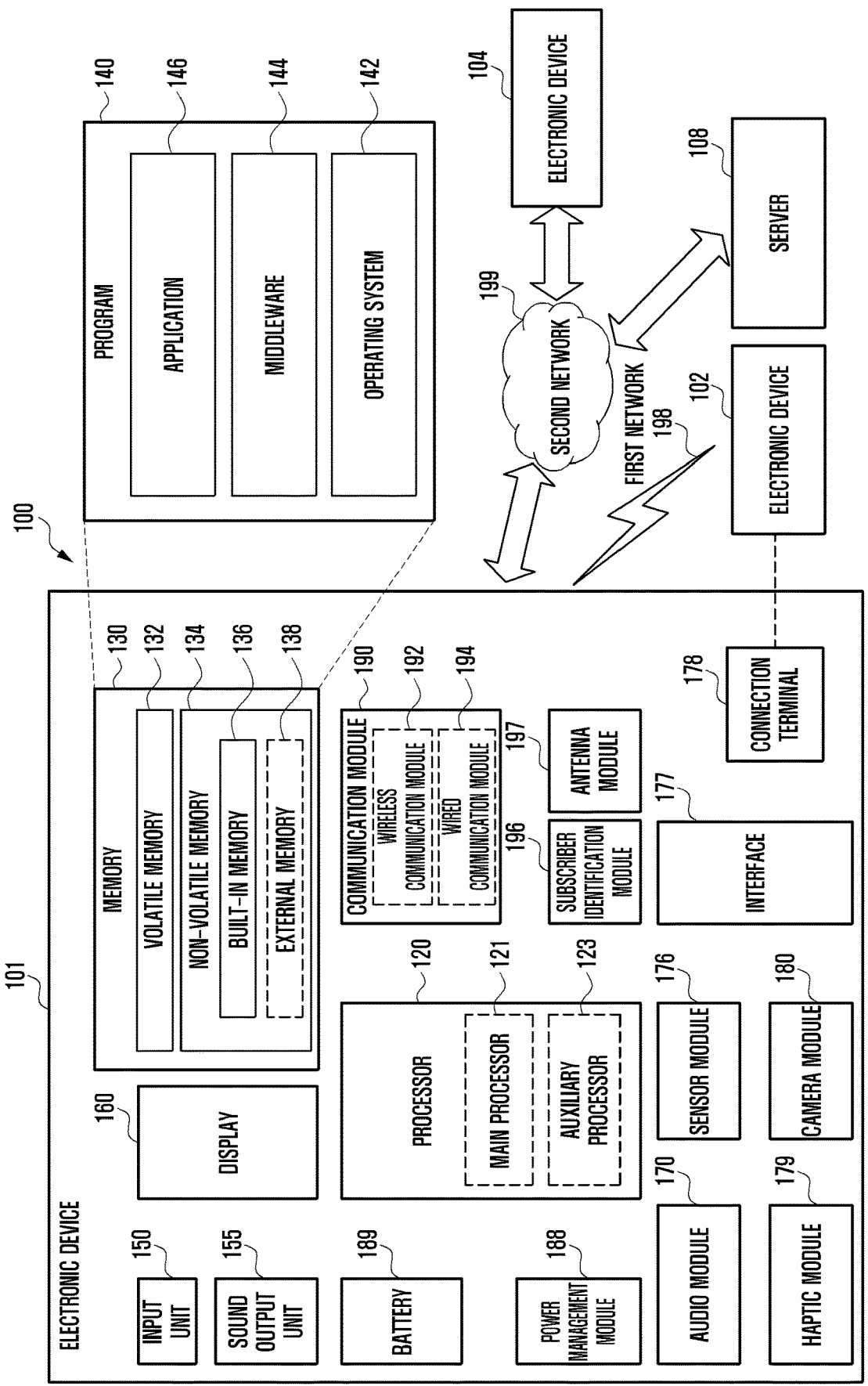
FIG. 1 illustrates an electronic device in a network environment according to an embodiment.

Various embodiments of the disclosure will now be described in detail with reference to the accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

With regard to the description of drawings, similar components may be marked by similar reference numerals.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
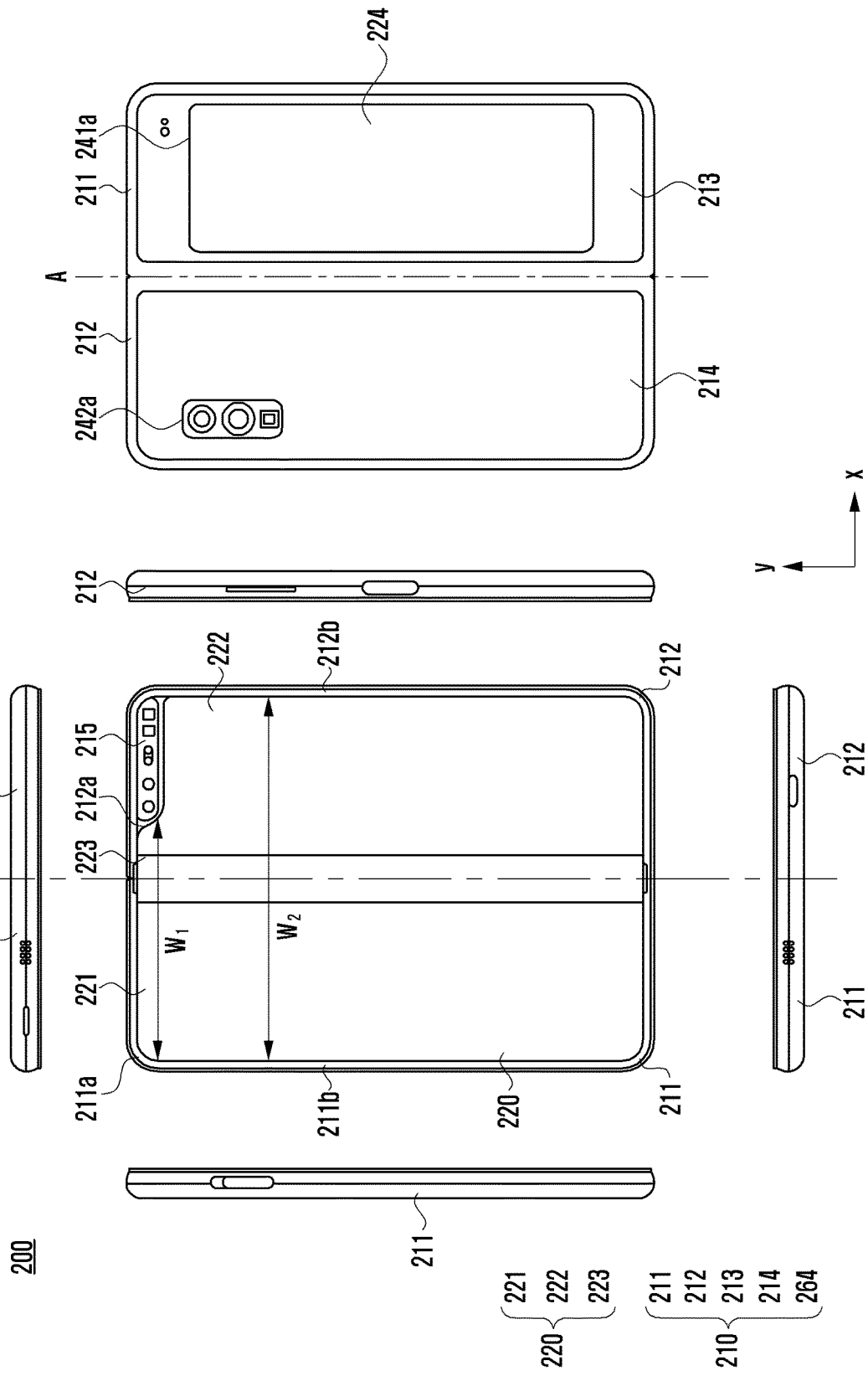
FIG. 2A illustrates an unfolded state of an electronic device according to an embodiment.
Figure 2C:
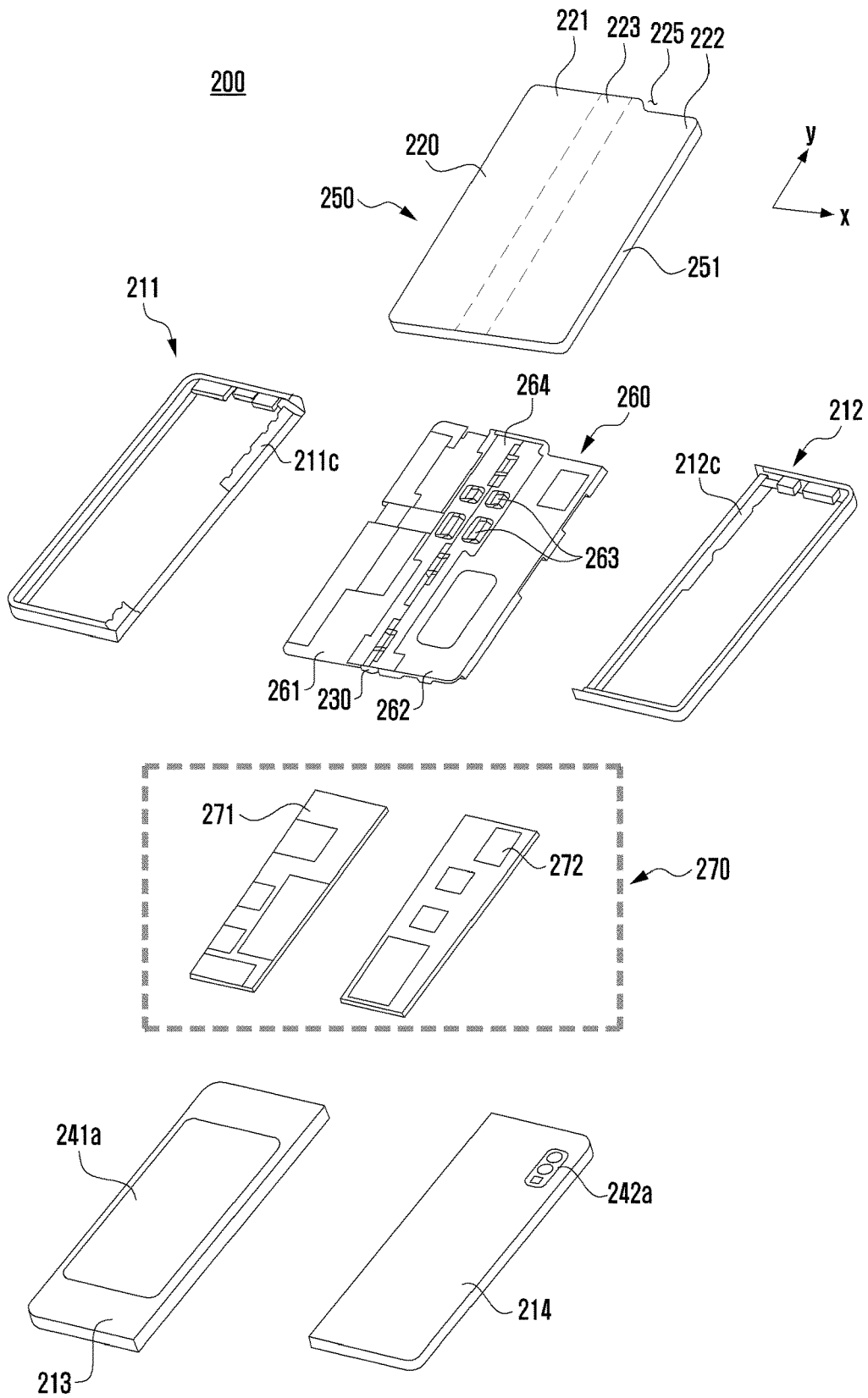
FIG. 2C illustrates an exploded perspective view of the electronic device of FIG. 2A.
Figure 2D:
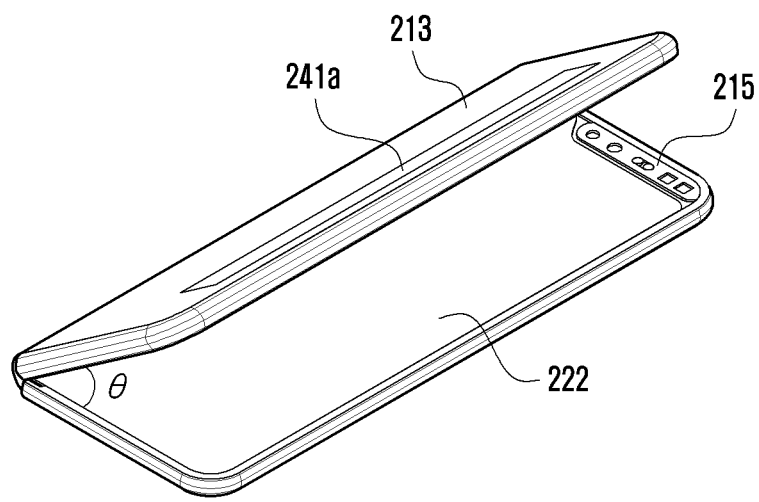
FIG. 2D illustrates an intermediate state of the electronic device of FIG. 2A.
Figure 2D:
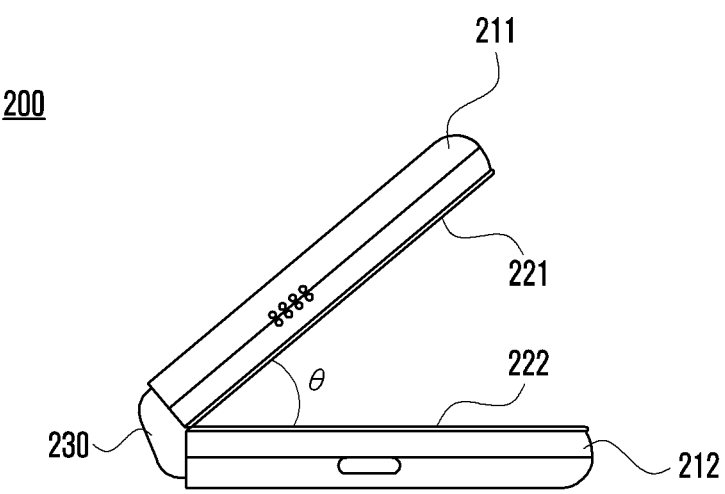

FIG. 2A illustrates an unfolded state of an electronic device according to an embodiment. FIG. 2B illustrates a folded state of the electronic device of FIG. 2A. FIG. 2C illustrates an exploded perspective view of the electronic device of FIG. 2A. FIG. 2D illustrates an intermediate state of the electronic device of FIG. 2A.

Referring to FIGS. 2A, 2B, and 2C, an electronic device 200 includes a foldable housing 210, a hinge cover 230 that covers a foldable portion of the foldable housing 210, and a flexible or foldable display 220 (e.g., the display 160 of FIG. 1) that is disposed in a space formed by the foldable housing 210. Herein, a surface on which the display 220 is disposed is defined as a front surface of the electronic device 200, and a surface opposite to the front surface is defined as a rear surface of the electronic device 200. A surface that surrounds a space between the front surface and the rear surface is defined as a lateral surface of the electronic device 200.

As illustrated in FIGS. 2A, 2B, 2C and 2D, the foldable housing 210 includes a first housing structure 211, a second housing structure 212 that includes a sensor region 215, a first rear surface cover 213, a second rear surface cover 214, and a hinge structure 264. The first housing structure 211 is connected to the hinge structure 264, and may include a first surface that is directed in a first direction and a second surface that is directed in a second direction opposite to the first direction. A part of the display 220 may be formed as at least a part of the first surface, and the first rear surface cover 213 may be formed as at least a part of the second surface. The second housing structure 212 may be connected to the hinge structure 264, may include a third surface that is directed in a third direction and a fourth surface that is directed in a fourth direction opposite to the third direction, and may be folded about the hinge structure 264 along with the first housing structure 211. Another part of the display 220 may be formed as at least a part of the third surface, and the second rear surface cover 214 may be formed as at least a part of the fourth surface. The first surface may face the third surface in a state in which the foldable housing 210 is folded, and the third direction may be the same as the first direction in a state in which the foldable housing 210 is unfolded. The foldable housing 210 of the electronic device 200 is not limited to a form and coupling illustrated in FIGS. 2A and 2B, and may be realized by a combination and/or coupling of other shapes or components. For example, the first housing structure 211 and the first rear surface cover 213 may be integrally formed, and the second housing structure 212 and the second rear surface cover 214 may be integrally formed.

The first housing structure 211 and the second housing structure 212 are disposed on both sides of a folding axis (an A axis), and may have shapes that are symmetrical with respect to the folding A axis on the whole. As will be described below, an angle θ or a distance formed by the first housing structure 211 and the second housing structure 212 may vary according to whether the electronic device 200 is in an unfolded state, in a folded state, or in an intermediate state. The second housing structure 212 further includes a sensor region 215 in which various sensors are disposed, unlike the first housing structure 211, and may have a shape that is symmetrical with the first housing structure 211 in the region other than the sensor region 215.

As illustrated in FIG. 2A, a recess in which the display 220 is housed may be formed in the first housing structure 211 and the second housing structure 212. Due to the sensor region 215, the recess may have two or more widths that are different from each other in a direction perpendicular to the folding A axis.

For example, the recess may have (1) a first width w1 between a first portion 211a parallel to the folding A axis in the first, housing structure 211 and a first portion 212a formed at an edge of the sensor region 215 in the second housing structure 212, and (2) a second width w2 that is formed by a second portion 211b of the first housing structure 211 and a second portion 212b of the second housing structure 212, which is not included in the sensor region 215 and is parallel to the folding A axis. The second width w2 wider than the first width w 1. That is, the first portion 211a of the first housing structure 211 and the first portion 212a of the second housing structure 212, both of which have shapes that are generally symmetrical with each other, may form the first width w1 of the recess, and the second portion 211b of the first housing structure 211 and the second portion 212b of the second housing structure 212, both of which have shapes that are asymmetrical with each other, may form the second width w2 of the recess. The first and second portions 212a and 212b of the second housing structure 212 may be different from each other in a distance from the folding A axis. The widths of the recess are not limited to the illustrated example. The recess may have a plurality of widths due to the form of the sensor region 215 or the portions of the first and second housing structures 211 and 212 which have shapes that are asymmetrical with each other.

At least a part of the first housing structure 211 and a part of the second housing structure 212 may be formed of a metallic or nonmetallic material having rigidity selected to support the display 220.

The sensor region 215 may be formed to have a certain region adjacent to one corner of the second housing structure 212. However, disposition, a shape, and a size of the sensor region 215 are not limited to the illustrated example. For example, the sensor region 215 may be provided in another corner of the second housing structure 212 or in an arbitrary region between upper and lower ends of the second housing structure 212.

Components for performing various functions installed in the electronic device 200 may be visible in front of the electronic device 200 through the sensor region 215 or one or more openings provided in the sensor region 215. The components may include a variety of sensors, e.g., at least one of an illuminance sensor, a front camera, a receiver, or a proximity sensor. The illuminance sensor may include a photodiode for reading a red, green, blue (RGB) value of a visible ray and an analog-to-digital converter (ADC) for digitalizing the RGB value, may convert the digitalized RGB value into an illuminance value, and may output the illuminance value to a processor of the electronic device 200. The processor may be operatively connected to the illuminance sensor disposed in the sensor region 215, may receive the illuminance value from the illuminance sensor, and may control brightness of the display 220 using the received illuminance value.

The sensor (e.g., the illuminance sensor) may be disposed between a second region 222 of the display and a second bracket 262 of a bracket assembly 260. The sensor may be visible in front of the electronic device 200 through an opening formed in the second region 222.

The first rear surface cover 213 may be disposed on one side of the folding axis in the rear of the electronic device 200, and may have a substantially rectangular periphery, and the periphery may be surrounded by the first housing structure 211. Likewise, the second rear surface cover 214 may be disposed on the other side of the folding axis on the rear surface of the electronic device 200, and a periphery thereof may be surrounded by the second housing structure 212.

The first rear surface cover 213 and the second rear surface cover 214 may have shapes that are substantially symmetrical with respect to the folding axis (the A axis). However, the first rear surface cover 213 and the second rear surface cover 214 do not necessarily have the symmetrical shapes. The electronic device 200 may include the first rear surface cover 213 and the second rear surface cover 214 formed in various shapes. Further, the first rear surface cover 213 may be formed integrally with the first housing structure 211, and the second rear surface cover 214 may be formed integrally with the second housing structure 212.

The first rear surface cover 213, the second rear surface cover 214, the first housing structure 211, and the second housing structure 212 may define a space in which various components of the electronic device 200 (e.g., a printed circuit board (PCB), or a battery) may be disposed.

One or more components may be disposed or be visually exposed on the rear surface of the electronic device 200. For example, at least a part of a sub-display 224 and/or a sensor (e.g., a second illuminance sensor different from the illuminance sensor that is visible in front of the electronic device 200) may be visible through a first rear surface region 241a of the first rear surface cover 213. The second illuminance sensor may be disposed below the sub-display 224 when viewed above the first rear surface cover 213. The second illuminance sensor may be visible in the rear of the electronic device 200 through an opening formed in the sub-display 224, or may be disposed in the first rear surface region 241a or in another region of the first rear surface cover 213 other than the first rear surface region 241a. The processor of the electronic device 200 may be operatively connected to the second illuminance sensor disposed in the first rear surface region 241a, may receive an illuminance value from the second illuminance sensor, and may control the brightness of the display 220 using the received illuminance value.

One or more components or sensors (e.g., a proximity sensor and/or a rear camera) may be visible through a second rear surface region 242a of the second rear surface cover 214. The second illuminance sensor may be disposed in the second rear surface cover 214. For example, the second illuminance sensor may be disposed in the second rear surface region 242a or a region other than the second rear surface region 242a.

Referring to FIG. 2B, the hinge cover 230 may be disposed between the first housing structure 211 and the second housing structure 212, and be configured to be able to cover the internal component (e.g., the hinge structure 264). The hinge cover 230 may be covered or exposed outward by a part of the first housing structure 211 and a part of the second housing structure 212 according to a state (an unfolded state or a folded state) of the electronic device 200.

As illustrated in FIG. 2A, when the electronic device 200 is in an unfolded state, the hinge cover 230 may be covered without exposure by the first housing structure 211 and the second housing structure 212. As illustrated in FIG. 2B, when the electronic device 200 is in a folded state (e.g., a fully folded state), the hinge cover 230 may be exposed outward between the first housing structure 211 and the second housing structure 212. In an intermediate state in which the first housing structure 211 and the second housing structure 212 are folded at a certain angle θ, the hinge cover 230 may be partly exposed outward between the first housing structure 211 and the second housing structure 212. However, a region exposed in this case may be smaller than that exposed in the fully folded state. The hinge cover 230 may include a curved surface.

The display 220 may be disposed in a space defined by the foldable housing 210. The display 220 may be seated in the recess formed in the foldable housing 210, and may occupy most of the front surface of the electronic device 200.

The front surface of the electronic device 200 may include the display 220, and partial regions of the first and second housing structures 211 and 212 which adjoin the display 220. The rear surface of the electronic device 200 may include the first rear surface cover 213, a partial region of the first housing structure 211 which adjoins the first rear surface cover 213, the second rear surface cover 214, and a partial region of the second housing structure 212 which adjoins the second rear surface cover 214.

At least a partial region of the display 220 can be deformed to a flat surface or a curved surface. The display 220 includes a foldable region 223, a first region (or a first portion) 221 that is disposed on one side of the foldable region 223 (the left side of the foldable region 223 illustrated in FIG. 2A) and defines at least a part of the first surface, and a second region (or a second portion) 222 that is disposed on the other side of the foldable region 223 (the right side of the foldable region 223 illustrated in FIG. 2A) and defines at least a part of the third surface.

The region division of the display 220 illustrated in FIG. 2A is given by way of example, and the display 220 may be divided into a plurality of regions (e.g., four or more regions or two regions) according to a structure or a function.

In FIG. 2A, the region of the display 220 is divided by the foldable region 223 or the folding axis (the A axis) that extends in parallel to the y axis. However, the region of the display 220 may be divided based on another foldable region (e.g., a foldable region parallel to the x axis) or another folding axis (e.g., a folding axis parallel to the x axis).

The first region 221 and the second region 222 may have shapes that are symmetrical with respect to the foldable region 223 on the whole. However, unlike the first region 221, the second region 222 may include a cut notch according to presence of the sensor region 215, but may have a shape that is generally symmetrical with the first region 221 in the region other than the cut notch. That is, the first region 221 and the second region 222 may include portions whose shapes are symmetrical with each other, and portions whose shapes are asymmetrical with each other.

When the electronic device 200 is in an unfolded state (e.g., as illustrated in FIG. 2A), the first housing structure 211 and the second housing structure 212 may be disposed at an angle of 180 degrees to be directed in the same direction. A surface of the first region 221 of the display 220 and a surface of the second region 222 of the display 220 may be formed at an angle of 180 degrees with respect to each other, and be directed in the same direction (e.g., in a direction of the front surface of the electronic device). The foldable region 223 may be disposed on the same flat surface as the first region 221 and the second region 222.

When the electronic device 200 is in a folded state (e.g., as illustrated in FIG. 2B), the first housing structure 211 and the second housing structure 212 may face each other. The surface of the first region 221 of the display 220 and the surface of the second region 222 of the display 220 may be formed at a small angle θ of 180 degrees (e.g., between 0 and 10 degrees) with respect to each other, and may face each other. The foldable region 223 may have a curved surface, at least a part of which has a certain curvature.

When the electronic device 200 is in an intermediate state, the first housing structure 211 and the second housing structure 212 may be disposed at a certain angle θ with respect to each other. The surface of the first region 221 of the display 220 and the surface of the second region 222 of the display 220 may be formed at an angle θ that is larger than in the folded state and is smaller than that in the unfolded state. The foldable region 223 may have a curved surface, at least a part of which has a certain curvature. In this case, the curvature may be smaller than that in the case of the folded state.

Referring to FIG. 2C, the electronic device 200 includes a display unit 250, a bracket assembly 260, a circuit board 270, the first housing structure 211, the second housing structure 212, the first rear surface cover 213, and the second rear surface cover 214. The display unit 250 used herein may be referred to as a display module or a display assembly.

The display unit 250 includes the display 220, and one or more plates or layers 251 on which the display 220 is seated. The plate 251 may be disposed between the display 220 and the bracket assembly 260. The display 220 may be disposed on at least a part of one surface of the plate 251 (e.g., an upper surface of the plate 251 in FIG. 2C). The plate 251 may be formed in a shape corresponding to the display 220. For example, a partial region of the plate 251 may be formed in a shape corresponding to a notch 225 of the display 220.

The bracket assembly 260 includes a first bracket 261, a second bracket 262, a hinge structure 264 that is disposed between the first bracket 261 and the second bracket 262, the hinge cover 230 that covers the hinge structure 264 when viewed from the outside, and a wiring member 263 (e.g., a flexible printed circuit board (FPCB)) that crosses the first bracket 261 and the second bracket 262.

The bracket assembly 260 may be disposed between the plate 251 and the circuit board 270. The first bracket 261 may be disposed between the first region 221 of the display 220 and a first circuit board 271 (e.g., a PCB). The second bracket 262 may be disposed between the second region 222 of the display 220 and a second circuit board 272 (e.g., a PCB).

At least a part of the wiring member 263 and the hinge structure 264 may be disposed in the bracket assembly 260. The wiring member 263 may be disposed in a direction (e.g., a direction of the x axis) in which the wiring member 263 crosses the first bracket 261 and the second bracket 262. The wiring member 263 may be disposed in a direction (e.g., a direction of the x axis) perpendicular to the folding axis of the foldable region 223 of the electronic device 200 (e.g., the y axis or the folding A axis of FIG. 2A).

The circuit board 270 includes the first circuit board 271 that is disposed adjacent to the first bracket 261, and the second circuit board 272 that is disposed adjacent to the second bracket 262. The first circuit board 271 and the second circuit board 272 may be disposed in a space defined by the bracket assembly 260, the first housing structure 211, the second housing structure 212, the first rear surface cover 213, and the second rear surface cover 214. Components for realizing various functions of the electronic device 200 may be mounted on the first circuit board 271 and the second circuit board 272.

At least one angle detecting sensor configured to generate data for detecting an angle θ formed by the first surface and the third surface may be disposed in the above space. A first motion sensor acting as one of the angle detecting sensors may be disposed on the first circuit board 271, and a second motion sensor acting as another one of the angle detecting sensors may be disposed on the second circuit board 272. Each of the first motion sensor and the second motion sensor may include an acceleration sensor and/or a gyro sensor. Each of the motion sensors may measure a posture of the electronic device 200, and an angular velocity and/or an acceleration of a surface on which the motion sensor is disposed, and may transmit the measured results to the processor, and the processor may determine an angle θ based on the data received from each of the motion sensors.

The angle detecting sensor may include an encoder sensor that is attached to the hinge structure 264 and is configured to detect an angle θ. For example, the encoder sensor may transmit a discrete value designated at each angle formed by the first surface and the third surface to the processor, and the processor may determine an angle θ based on the value received from the encoder sensor.

The first housing structure 211 and the second housing structure 212 may be assembled with each other to be coupled on both sides of the bracket assembly 260 when the display unit 250 is coupled to the bracket assembly 260. The first housing structure 211 and the second housing structure 212 may be coupled with the bracket assembly 260 by sliding on both sides of the bracket assembly 260.

The first housing structure 211 includes a first rotary support surface 211c, and the second housing structure 212 includes a second rotary support surface 212c corresponding to the first rotary support surface 211c. Each of the first rotary support surface 211c and the second rotary support surface 212c may include a curved surface corresponding to that included in the hinge cover 230.

When each of the first rotary support surface 211c and the second rotary support surface 212c cover the hinge cover 230 while the electronic device 200 is in the unfolded state (e.g., as illustrated in FIG. 2A), the hinge cover 230 is not exposed to a rear surface of the electronic device 200 or be exposed to the minimum extent. The first rotary support surface 211c and the second rotary support surface 212c may rotate along the curved surface included in the hinge cover 230 in the case where the electronic device 200 is in the folded state (e.g., as illustrated in FIG. 2B), so that the hinge cover 230 can be exposed to the rear surface of the electronic device 200 to the maximum extent.

Figure 3A:
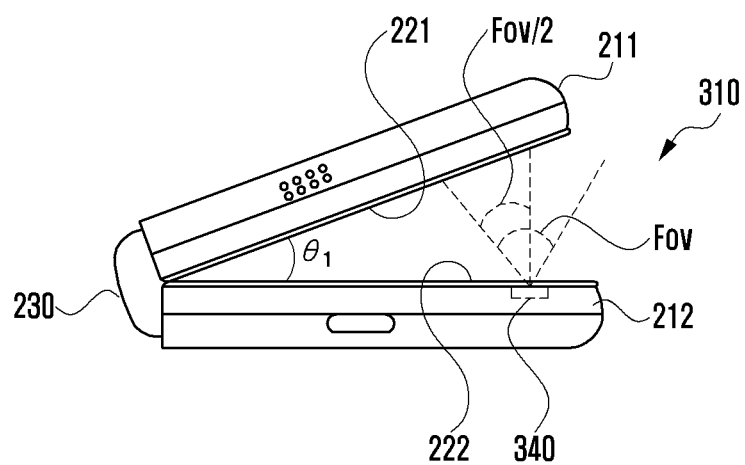
FIG. 3A illustrates a first intermediate state of the electronic device of FIG. 2A.
Figure 3B:
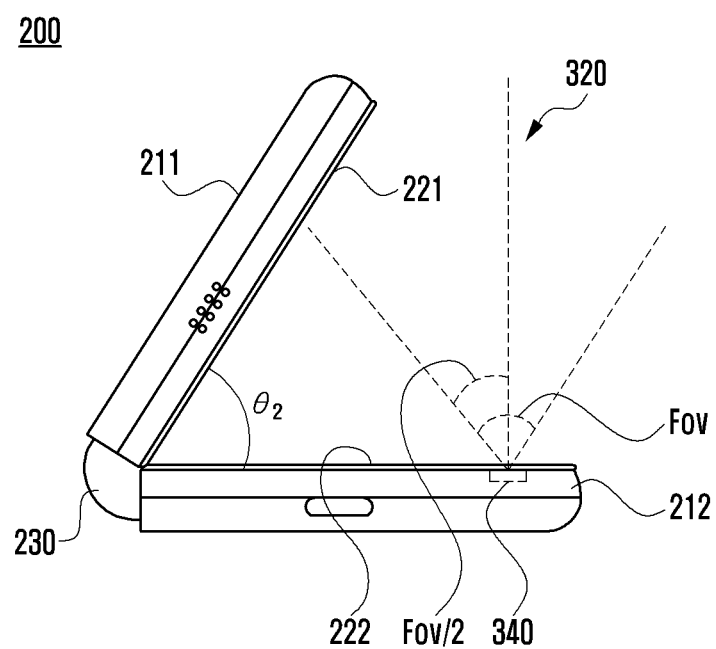
FIG. 3B illustrates a second intermediate state of the electronic device of FIG. 2A.
Figure 3C:
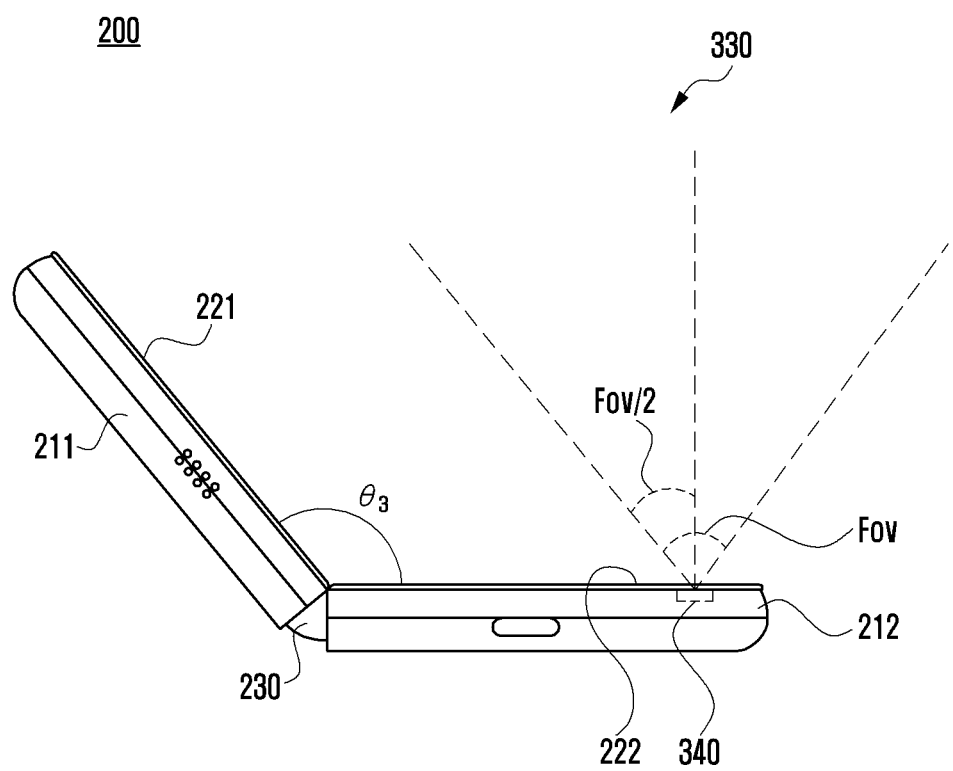
FIG. 3C illustrates a third intermediate state of the electronic device of FIG. 2A.

FIG. 3A illustrates a first intermediate state of the electronic device of FIG. 2A. FIG. 3B illustrates a second intermediate state of the electronic device of FIG. 2A. FIG. 3C illustrates a third intermediate state of the electronic device of FIG. 2A.

Referring to FIGS. 3A, 3B and 3C, an illuminance sensor 340 is disposed on a surface in which the second region 222 is formed (e.g., the sensor region 215 of FIG. 2A).

The state of the electronic device 200 may be classified into a first intermediate state 310, a second intermediate state 320, and a third intermediate state 330 according to whether an illuminance around the electronic device can be measured, and whether brightness of the display has an influence on the measurement of the illuminance.

In the first intermediate state (or the unmeasurable state) 310, a first angle θ1 formed by both the first surface on which the first region 221 is formed and the third surface on which the second region 222 is formed is less than a first critical value (e.g., 30 degrees), and thus a field of view (FOV) of the illuminance sensor 340 is mostly, if not completely, obstructed by the first region 221, or the illuminance sensor 340 receives a certain intensity of radiation or less to fail to measure the illuminance around the electronic device. The first critical value may be selected by measurement or experiment. For example, the first critical value may be determined based on the position of the illuminance sensor 340, the FOV of the illuminance sensor 340, the size of the display 220, and/or the form of the electronic device.

In the second intermediate state (or the display interference state) 320, a second angle θ2 formed by both the first surface on which the first region 221 is formed and the third surface on which the second region 222 is formed is greater than or equal to the first critical value so that the FOV can be at least partly secured, but is less than a second critical value, such that light emitted from the first region 221 is received by the illuminance sensor 340, and thereby brightness of the first region 221 can have an influence on the measured result of the illuminance sensor 340. The illuminance value measured in the second intermediate state may be corrected by considering an influence of the brightness of the first region 221. For example, when the FOV is 90 degrees, the second critical value may be an angle of 135 degrees (FOV/2 45 degrees)+90 degrees) at which a direction in which the first housing structure 211 is directed and a direction in which the left side of the FOV (the left side in FIG. 3C) is directed are parallel to each other.

In the third intermediate state (or a measurable state) 330, a third angle θ3 formed by both the first surface on which the first region 221 is formed and the third surface on which the second region 222 is formed is greater than or equal to the second critical value so that the brightness of the first region 221 does have an influence on the measured result of the illuminance sensor 340 (i.e., is free from an influence of the first region 221), and the illuminance around the electronic device can be measured by the illuminance sensor 340.

Figure 4:
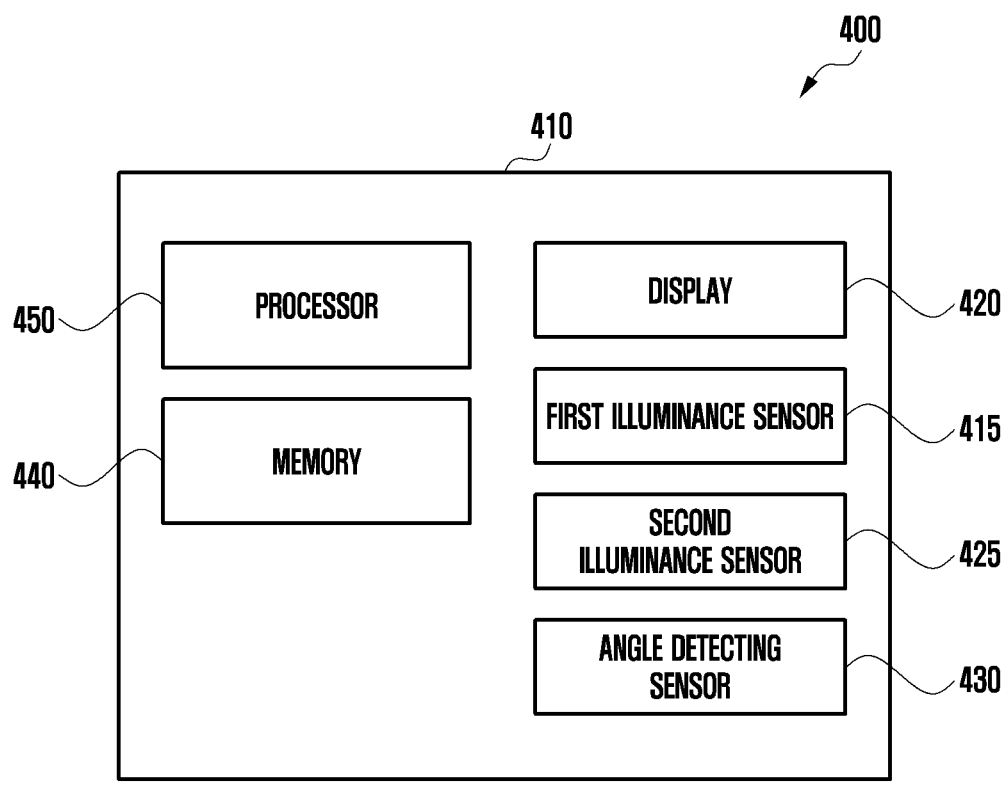
FIG. 4 illustrates the electronic device, according to the an embodiment.

FIG. 4 illustrates an electronic device, according to an embodiment.

Referring to FIG. 4, an electronic device 400 includes a foldable housing 410, a display 420, a first illuminance sensor 415, a second illuminance sensor 425, an angle detecting sensor 430, a memory 440, and a processor 450. As described above with reference to FIGS. 2A to 2D, the foldable housing 410 may include a hinge structure, a first housing structure having a first surface and a second surface, and a second housing structure having a third surface and a fourth surface. A first region of the display 420 may have the first surface of the first housing structure, and a second region of the display 420 may have the third surface of the second housing structure.

The first illuminance sensor 415 may generate data used to check illuminance around the electronic device 400. The first illuminance sensor 415 may be disposed on the third of the second housing structure. The second illuminance sensor 425 may generate data used to check illuminance around the electronic device 400. The second illuminance sensor 425 may be disposed on the second surface of the first housing structure.

The angle detecting sensor 430 may generate data used to check the angle θ. For example, the angle detecting sensor 430 may include an encoder sensor attached to the hinge structure or may include a first motion sensor disposed in the first housing structure, and a second motion sensor disposed in the second housing structure.

The memory 440 may be disposed in the foldable housing 410, and may store a lookup table that includes a reference value for comparison with an illuminance value measured by the first illuminance sensor 415 with respect to an angle (e.g., an angle θ as illustrated in FIG. 2D) formed by the first surface and the third surface. For example, Table 1, as shown below, includes an illuminance value measured at each angle by the first illuminance sensor 415 in an environment in which surroundings of the electronic device 400 are dim and the display 420 emits light with designated brightness (e.g., a normal level) and a designated color (e.g., a white color). The illuminance value included in the lookup table may be used as a basis for determining whether or not to use the illuminance value measured by the first illuminance sensor 415.

The processor 450 may use an illuminance value measured previously, without using the measured illuminance value or a minimum illuminance value based on the lookup table (e.g., may transmit the illuminance value to the component (e.g., the display 420) or a service that makes a request for the illuminance value). Angles of less than 30 degrees in Table 1 may refer to the unmeasurable state (e.g., the first intermediate state 310 of FIG. 3A). Angles between 30 degrees and 135 degrees in Table 1 may refer to the display interference state (e.g., the second intermediate state 320 of FIG. 3B). Angles of more than 135 degrees in Table 1 may refer to the measurable state (e.g., the third intermediate state 330 of FIG. 3C).

The processor may provide a configuration menu that allows a user to configure brightness of the screen. For example, the processor may provide a configuration of five steps of "dimmest," "dim," "normal," "bright," and "brightest." The lookup table of Table 1 may be provided based on normal brightness, and lookup tables corresponding to the other steps may present in the memory 440. According to the brightness (e.g., dimmest, dim, normal, bright, or brightest) configured by a user, the processor may make reference to lookup tables different from one another.

TABLE 1

| Angle | | Illuminance (lux) |
|---|---|---|
| Less than 30 degrees | | Unmeasurable state |
| 30 ≤ Angle < 50 | 75 | Display |
| 50 ≤ Angle < 70 | 60 | interference |
| 70 ≤ Angle < 90 | 30 | state |
| 90 ≤ Angle < 110 | 13 | |
| 110 ≤ Angle < 135 | 4 | |
| More than 135 degrees | | Measurable state |

The processor 450 may be disposed in the foldable housing 410, and be operatively connected to the display 420, the first illuminance sensor 415, the second illuminance sensor 425, the angle detecting sensor 430, and the memory 440.

The processor 450 may determine an angle formed by the first surface on which the first region is formed and the third surface on which the second region is formed using data received from the angle detecting sensor 430, and may determine a state of the electronic device 400 based on the angle. For example, when the angle is less than 10 degrees, the processor 450 may determine the electronic device 400 as being in the folded state (e.g., as illustrated in FIG. 2B). When the angle is greater than 10 degrees and is less than the first critical value (e.g., 30 degrees), the processor 450 may determine the electronic device 400 as being in the first intermediate state (or the unmeasurable state). When the angle is greater than the first critical value and is less than the second critical value (e.g., 135 degrees), the processor 450 may determine the electronic device 400 as being in the second intermediate state (or the display interference state). When the angle is greater than the second critical value, the processor 450 may determine the electronic device 400 as being in the third intermediate state (or the measurable state). When the angle is 180 degrees, the processor 450 may determine the electronic device 400 as being in the unfolded state (e.g., as illustrated in FIG. 2A). The unfolded state may also be defined as a state in which an illuminance departing from interference of the display 420 can be measured.

The processor 450 may control ON/OFF operations of the display 420 based on the state of the electronic device 400. When the electronic device 200 is in the folded state, the processor 450 may turn off the display 420, and when the electronic device 200 converts from the folded state to the first intermediate state, the processor 450 may turn on the display 420. When the electronic device 200 convert from the first intermediate state to the second intermediate state, the processor 450 may turn on the display 420, and when the electronic device 400 converts from the second intermediate state to the third intermediate state in which an ambient illuminance can be measured, the processor 450 may turn on the display 420.

The processor 450 may control the brightness of the display 420 based on the state of the electronic device 400. The processor 450 may control the display 420 to display designated brightness (e.g., minimum brightness) as the state of the electronic device 400 is converted from the folded state to the first intermediate state, and increase the brightness of the display 420 as the angle increases. When the electronic device 200 converts to the third intermediate state in which the ambient illuminance can be measured, the processor 450 may control the brightness of the display 420 based on the illuminance value received from the first illuminance sensor 415. The processor 450 may control the display 420 to maintain the designated brightness (e.g., the minimum brightness) while the electronic device 400 is in the first intermediate state or the second intermediate state. When the electronic device 400 converts to the third intermediate state, the processor 450 may stop the operation for maintaining the brightness, and may control the brightness of the display 420 based on the illuminance value received from the first illuminance sensor 415.

The processor 450 may control a color of the display 420 based on the state of the electronic device 400. For example, when the electronic device 200 is the second intermediate state, the processor 450 may configure the color of the first region as a black color, such that brightness of the first region of the display 420 does not interfere with measurement of the ambient illuminance of the first illuminance sensor 415. That is, the processor 450 may configure a base color of the first region as a black color until the electronic device 200 is converted to the third intermediate state, and display displayed information only in the second region.

The processor 450 may receive the illuminance value from other components (e.g., the display 420) of the electronic device 400 or a service (e.g., an application and/or middleware) that makes a request for the illuminance value, and activate the first illuminance sensor 415 based on the request. The processor 450 may receive the illuminance value from the activated first illuminance sensor 415, and determine whether or not to transmit the received illuminance value to another component based on the state of the electronic device 400. For example, when the electronic device 400 is in the first intermediate state, the processor 450 may transmit an illuminance value previously received when the electronic device 400 was in the third intermediate state or the unfolded state, an illuminance value received before a screen is turned on, or a minimum illuminance value to the other component without transmitting the illuminance value received from the first illuminance sensor 415. The processor 450 may inform the application of the state in which the ambient illuminance cannot be measured.

When ambient illuminance cannot be measured by the first illuminance sensor 415, the processor 450 may activate the second illuminance sensor 425, and transmit the illuminance value received from the second illuminance sensor 425 to another component.

When the display 420 is turned-on (in a power-on state) to emit light and the electronic device 400 is in the second intermediate state, the processor 450 may compare a first illuminance value received from the first illuminance sensor 415 with a lookup table (e.g., Table 1). The processor 450 may determine, based on a compared result, whether or not the electronic device 400 is in a low illuminance environment. For example, the processor 450 may check a second illuminance value, which corresponds to an angle determined using the angle detecting sensor 430, in the lookup table, and compare the second illuminance value with the first illuminance value received from the first illuminance sensor 415. When the second illuminance value is greater than or equal to the first illuminance value, the processor 450 may determine the electronic device 400 to be in a low illuminance environment (e.g., a dim environment). However, when the second illuminance value is less than the first illuminance value, the processor 450 may determine the electronic device 400 as being in an environment that is different from the low illuminance environment (e.g., a bright environment).

When the display 420 is turned off, and the electronic device 400 is in the second intermediate state, the first illuminance sensor 415 may secure a FOV, and may not receive interference from the display 420. Thus, when the display 420 is turned off, and the electronic device 400 is in the second intermediate state, the processor 450 may activate the first illuminance sensor 415. The processor 450 may determine, based on the illuminance value received from the activated first illuminance sensor 415, whether the electronic device 200 is in a low illuminance environment.

The processor 450 may determine, based on the state of the electronic device 400, whether or not to correct the illuminance value received from the first illuminance sensor 415. When the electronic device 400 is in the second intermediate state, the processor 450 may correct the first illuminance value received from the first illuminance sensor 415 based on the lookup table. For example, the processor 450 may check out a second illuminance value, which corresponds to an angle determined using the angle detecting sensor 430, in the lookup table, and correct a first illuminance value using the second illuminance value as a reference value of the first illuminance value received from the first illuminance sensor 415. The correcting process may include replacing the first illuminance value with a previously measured illuminance value or a minimum illuminance value. The processor 450 may transmit the corrected first illuminance value to another component of the electronic device 400 that requests the illuminance value, and control the brightness of the display 420 using the transmitted first illuminance value. When the electronic device 400 is in the measurable state (the third intermediate state or the unfolded state), the processor 450 may transmit the illuminance value received from the first illuminance sensor 415 to the component that has requested the illuminance value, without correcting the illuminance value, and control the brightness of the display 420 using the transmitted illuminance value.

Regardless of whether the display 420 is turned on/off and which state the electronic device 400 is in, the second illuminance sensor 425 may not receive interference from the display 420 upon measuring the ambient illuminance. Thus, when the electronic device 400 is in the folded state, the first intermediate state, or the second intermediate state, the processor 450 may activate the second illuminance sensor 425. The processor 450 may determine, based on the illuminance value received from the activated second illuminance sensor 425, whether or not the electronic device 400 is in a low illuminance environment.

The processor 450 may additionally correct the second illuminance value using the third illuminance value received from the activated second illuminance sensor 425. When the electronic device 400 is in the second intermediate state, the processor 450 may transmit the third illuminance value in place of the corrected second illuminance value to a component that requested the third illuminance value, and control the brightness of the display 420 using the transmitted third illuminance value.

The processor 450 may recognize a portion of the display 420 that has an influence on the FOV of the first illuminance sensor 415 based on the angle θ. For example, the processor 450 may recognize the first portion of the first region that has an influence on the FOV when the angle is the first angle θ1 as illustrated in FIG. 3A and the second portion (e.g., the region wider than the first portion) of the first region that has an influence on the FOV when the angle is the second angle θ2 as illustrated in FIG. 3B. The processor 450 may calculate a fraction of the black color at the recognized portion, and correct the illuminance value received from the first illuminance sensor 415 based on the calculated rate. For example, as the fraction of the black color becomes high, the processor 450 may reduce the illuminance value.

The processor 450 may check an angle based on the first data obtained from the angle detecting sensor 430. The processor 450 may check illuminance based on the second data obtained from the first illuminance sensor 415 when at least a part of the display 420 is activated. The processor 450 may determine whether the checked illuminance is within a first range corresponding to the checked angle or within a second range corresponding to the checked angle. For example, referring to Table 1, when the checked angle is 55 degrees, the processor 450 may recognize that 55 degrees is within the first angle range (50≤angle<70) and the reference value (60 lux) corresponds to the first angle range. According to the recognized result, the processor 450 may specify an illuminance range that is greater than 60 lux as a first range corresponding to 55 degrees, and an illuminance range that is less than 60 lux as a second range corresponding to 55 degrees. When the checked angle is 75 degrees, the processor 450 may recognize, from Table 1, that 75 degrees is within the second angle range (70≤angle<90) and the reference value (30 lux) corresponds to the first angle range. According to the recognized result, the processor 450 may specify an illuminance range that is greater than 30 lux as a first range corresponding to 75 degrees, and an illuminance range that is less than 30 lux as a second range corresponding to 75 degrees. When the illuminance based on the second data is within the first range corresponding to the checked angle, the processor 450 may operate the display 420 at the first brightness based on the checked illuminance. When the illuminance based on the second data is within the second range corresponding to the checked angle, the processor 450 may operate the display 420 at the second brightness, which is dimmer than the first brightness, based on the checked illuminance and angle. For example, when the illuminance based on the second data is within the second range, the processor 450 may determine a correction value using a previously measured illuminance value or a minimum illuminance value, and determine the second brightness based on the determined correction value.

Figure 5:
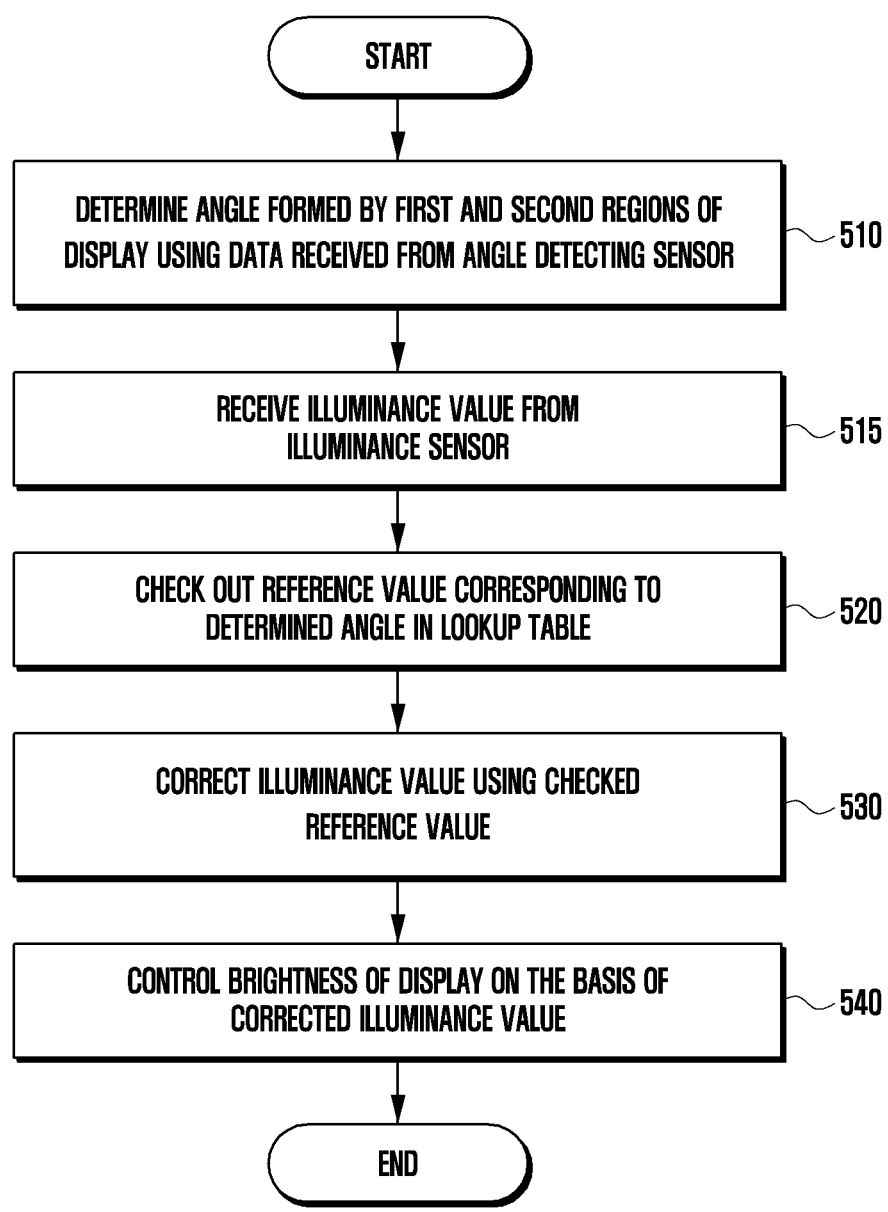
FIG. 5 illustrates processes performed in an electronic device according to an embodiment.

FIG. 5 illustrates processes performed in an electronic device according to an embodiment.

Referring to FIG. 5, processes may be performed by a processor of the electronic device.

In step 510, the processor determines an angle formed by a first region and a second region of the display using data received from an angle detecting sensor. The processor may determine an angle formed by the first surface on which the first region of the display is formed and the third surface on which the second region of the display is formed using the data received from the angle detecting sensor.

In step 515, the processor receives an illuminance value from the illuminance sensor disposed on the surface on which the second region is formed.

In step 520, the processor determines a reference value corresponding to the determined angle in a lookup table. The processor may access a memory to read the lookup table. The processor may determine an illuminance value corresponding to the angle in the lookup table as the reference value. The processor may perform step 520 before step 515.

In step 530, the processor corrects the illuminance value using the determined reference value. For example, when the illuminance value is less than or equal to the reference value, the processor may replace the illuminance value with a previously measured illuminance value or a minimum illuminance value. When the illuminance value is greater than the reference value, the processor may use it to control brightness of the display, without correcting the measured illuminance value. In addition, the processor may receive a second illuminance value from an illuminance sensor disposed on a surface other than the surface on which the display is formed, and additionally correct the corrected first illuminance value based on the second illuminance value.

In step 540, the processor controls the brightness of the display based on the corrected illuminance value.

Figure 6:
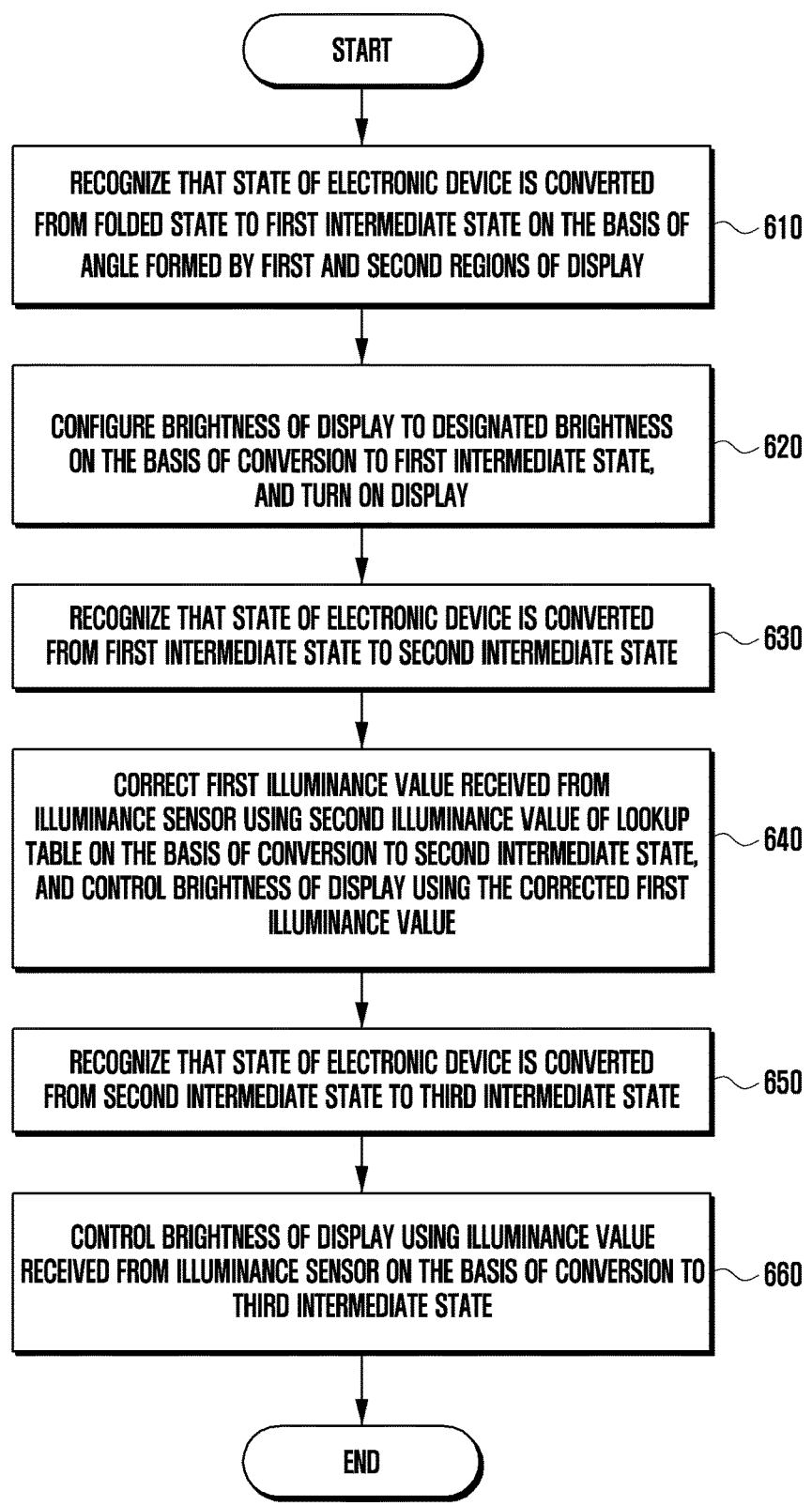
FIG. 6 illustrates processes performed in an electronic device according to an embodiment.

FIG. 6 illustrates processes performed in an electronic device according to an embodiment.

Referring to FIG. 6, processes may be performed by a processor of the electronic device.

In step 610, the processor recognizes that the electronic device converts from a folded state to a first intermediate state based on an angle formed by a first region and a second region of a display. For example, the processor may determine an angle formed by the first surface on which the first region of the display is formed and the third surface on which the second region of the display is formed using data received from an angle detecting sensor, and recognize that the electronic device is converted from the folded state to the first intermediate state based on the first angle. The folded state may be set to 0 to 10 degrees, and when the first angle exceeds 10 degrees, the processor may recognize that the state conversion occurs.

In step 620, the processor configures the brightness of the display to a designated brightness (e.g., minimum brightness) based on the conversion to the first intermediate state, and turns on the display. The processor may increase the brightness of the display in proportion to an increase in the angle while the electronic device is in the first intermediate state, and decrease the brightness of the display in proportion to a decrease in the angle.

In step 630, the processor recognizes that the electronic device is converted from the first intermediate state to the second intermediate state. For example, the processor may determine a second angle using data received from the angle detecting sensor, and recognize that the electronic device is converted from the first intermediate state to the second intermediate state based on the second angle. When the second angle exceeds the first critical value as described with reference to FIG. 3 above, the processor may recognize that the state conversion occurs.

In step 640, the processor corrects a first illuminance value received from an illuminance sensor (e.g., the first illuminance sensor 410 of FIG. 4) disposed on the third surface based on the conversion to the second intermediate state using a second illuminance value (e.g., a reference value) corresponding to the second angle in a lookup table, and controls the brightness of the display using the corrected first illuminance value. When the first illuminance value is less than or equal to the second illuminance value, the processor may replace the first illuminance value with a previously measured illuminance value or a minimum illuminance value, and use the replaced value to control the brightness of the display. When the first illuminance value is greater than the second illuminance value, the processor may use the first illuminance value to control the brightness of the display without correction. The processor may correct the first illuminance value based on the illuminance value received from an illuminance sensor (e.g., the second illuminance sensor 420 of FIG. 4) disposed on a surface other than the surface on which the display is formed. The processor may correct the brightness of the display using the corrected first illuminance value.

In step 650, the processor recognizes that the state of the electronic device is converted from the second intermediate state to a third intermediate state. For example, the processor may determine a third angle using the data received from the angle detecting sensor, and recognize that the electronic device is converted from the second intermediate state to the third intermediate state based on the third angle. When the third angle exceeds the second critical value as described above with reference to FIG. 3, the processor may recognize that the state conversion occurs.

In step 660, the processor controls the brightness of the display using the illuminance value received from the illuminance sensor based on the conversion to the third intermediate state. The processor may control the brightness of the display using the illuminance value received from the illuminance sensor in an unfolded state.

Alternatively, the brightness controlling process based on the increase or decrease in angle in step 620 may be omitted. For example, the processor may control the display to maintain designated brightness (e.g., a minimum brightness) while the electronic device is in the first intermediate state.

Figure 7:
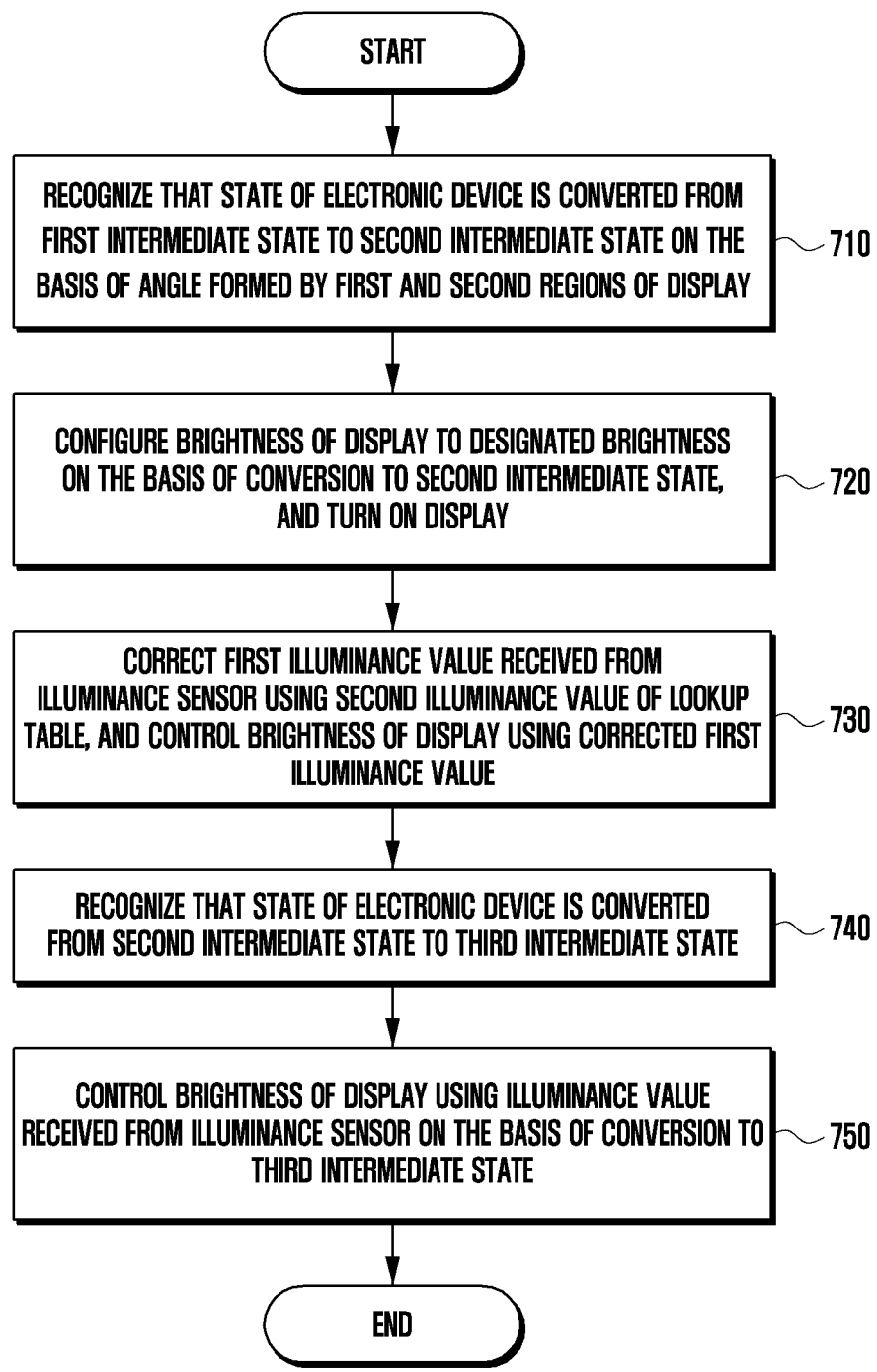
FIG. 7 illustrates processes performed in an electronic device according to an embodiment.

FIG. 7 illustrates processes performed in an electronic device according to an embodiment.

Referring to FIG. 7, processes may be performed by a processor in the electronic device.

In step 710, the processor recognizes that the electronic device is converted from a first intermediate state to a second intermediate state based on a first angle formed by a first region and a second region of a display. The processor may maintain the display in a turned-off state in the first intermediate state.

In step 720, the processor configures the brightness of the display to a designated brightness (e.g., a minimum brightness) based on the conversion to the second intermediate state, and turns on the display.

In step 730, the processor corrects the first illuminance value received from the illuminance sensor using a second illuminance value corresponding to the first angle in a lookup table, and controls the brightness of the display using the corrected first illuminance value. When the first illuminance value is less than or equal to the second illuminance value, the processor may replace the first illuminance value with a previously measured illuminance value or a minimum illuminance value, and use the replaced value to control the brightness of the display. When the first illuminance value is greater than the second illuminance value, the processor may use the first illuminance value to control the brightness of the display without correction.

In step 740, the processor recognizes that the electronic device is converted from the second intermediate state to a third intermediate state.

In step 750, the processor controls the brightness of the display using the illuminance value received from the illuminance sensor based on the conversion to the intermediate state. The processor may control the brightness of the display using the illuminance value received from the illuminance sensor in an unfolded state.

Figure 8:
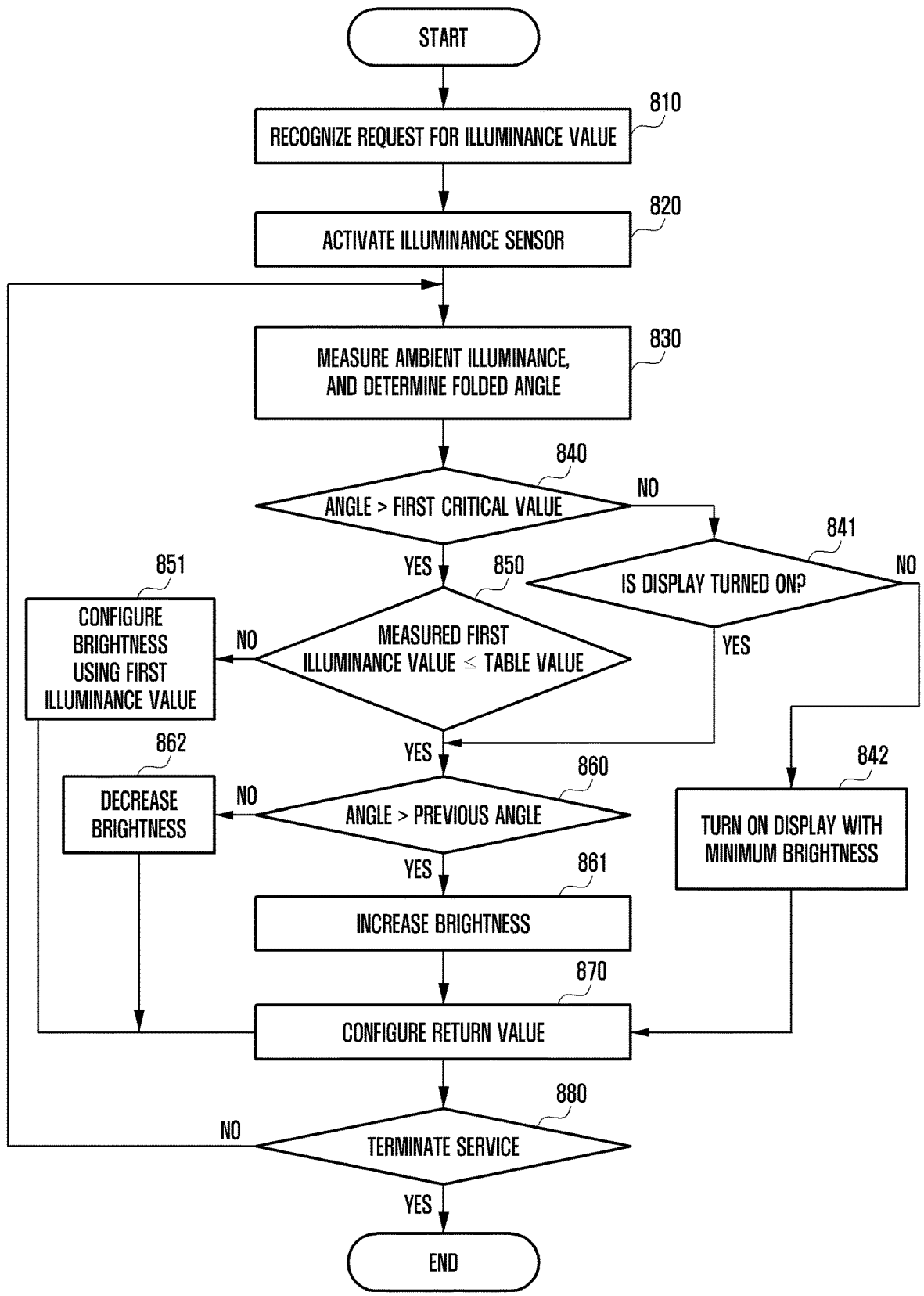
FIG. 8 illustrates processes performed in an electronic device according to an embodiment.

FIG. 8 illustrates processes performed in an electronic device according to an embodiment.

Referring to FIG. 8, the processes may be performed by a processor in the electronic device.

In step 810, the processor recognizes a request for an illuminance value from another component (e.g., a display 220, an application, or middleware) of the electronic device.

In step 820, the processor activates an illuminance sensor based on the recognition of the request for the illuminance value.

In step 830, the processor controls the illuminance sensor to measure an ambient illuminance, and determines an angle at which the display is folded using data received from an angle detecting sensor.

In step 840, the processor determines whether or not the angle exceeds a first critical value (e.g., 30 degrees).

In step 841, based on determining that the angle is less than or equal to the first critical value, the processor determines whether or not the display is in a turned-on state.

In step 842, based on determining that the display is not in the turned-on state, the processor configures a value of the brightness of the display to a minimum value of brightness, and turns on the display. The processor performs step 860, as will be described below, based on determining that the display is in the turned-on state.

In step 850, based on determining that the angle exceeds the first critical value in step 840, the processor determines whether or not a first illuminance value received from the illuminance sensor is less than or equal to a second illuminance value corresponding to the angle in a lookup table.

In step 851, based on determining that the first illuminance value exceeds the second illuminance value (i.e., that the surroundings of the electronic device are not under a low illuminance environment), the processor configures the value of the brightness of the display using the first illuminance value.

The processor may determine to use a illuminance value (or a minimum illuminance value), which is previously measured and received by the processor, instead of the first illuminance value (e.g., transmit it to the other component) based on a result of determining that the first illuminance value is less than or equal to the second illuminance value (determining to be a low illuminance environment) in step 850.

In step 860, the processor determines whether or not the angle determined at a point in time (t1) when step 830 was performed is greater than that determined at a previous point in time (t0).

In step 861, based on determining that the angle is greater than the previously determined angle, the processor configures the brightness of the display to a value of brightness that is greater than the previously configured value.

In step 862, based on determining that the angle is less than the previously determined angle, the processor configures the brightness of the display to a value of brightness that is less than the previously configured value. The processor may maintain the brightness of the display to a value of brightness which is equal to the previously configured value based on determining that the angle is equal to the previously determined angle.

In step 870, the processor configures a return value to be transmitted to the other component based on the value of brightness that is configured by performing step 842, 851, 861, or 862. For example, the processor may configure the configured value of brightness and/or the illuminance value (e.g., the measured illuminance value, the previously measured illuminance value, or the minimum illuminance value) to the return value, and transmit the configured return value to the other component.

In step 880, the processor determines whether or not to terminate the service for automatically adjusting the brightness. The processor may return to step 830 based on determining that the service is not terminated.

The processor may provide a configuration menu that allows a user to select automatic brightness of the screen. For example, the processor may provide five configuration steps of "dimmest," "dim," "normal," "bright," and "brightest." The lookup table of Table 1 may include illuminance value measured at each angle, for instance, in a situation in which the brightness of the display is normal, and lookup tables corresponding to the other steps may present in the memory.

During step 850, the processor may make use of lookup tables corresponding to the brightness configured by a user.

Figure 9:
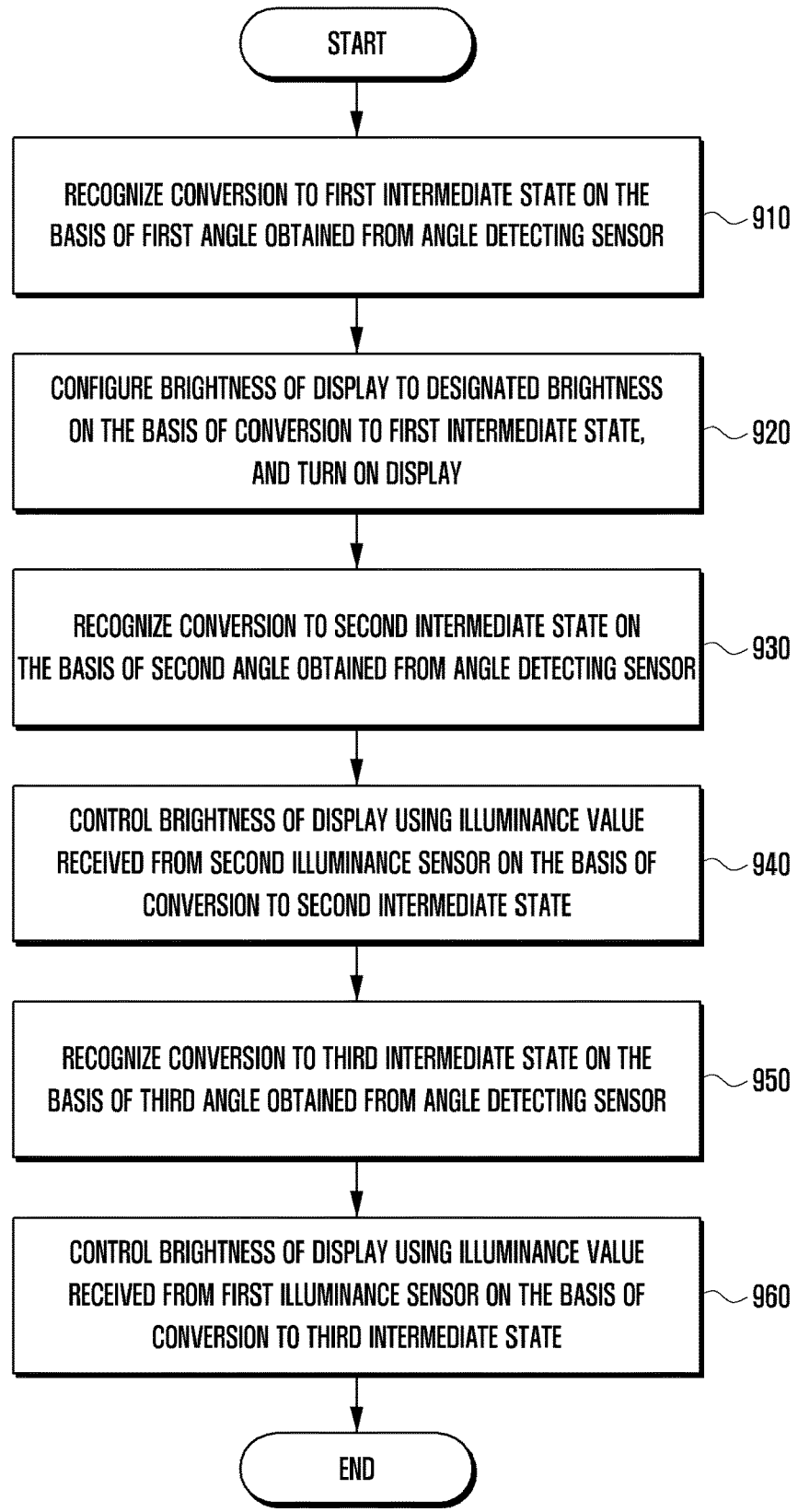
FIG. 9 illustrates processes performed in an electronic device according to an embodiment.

FIG. 9 illustrates processes performed in an electronic device according to an embodiment.

Referring to FIG. 9, the processes may be performed by a processor in the electronic device.

In step 910, the processor recognizes that the electronic device is converted from a folded state to a first intermediate state based on a first angle obtained from the angle detecting sensor.

In step 920, the processor configures the brightness of the display to designated brightness (e.g., a minimum brightness) based on the conversion to the first intermediate state, and turns on the display.

In step 930, the processor recognizes that the electronic device is converted from the first intermediate state to a second intermediate state based on a second angle obtained from the angle detecting sensor.

In step 940, the processor activates a second illuminance sensor based on the conversion to the second intermediate state, and uses an illuminance value received from the second illuminance sensor to control the brightness of the display.

In step 950, the processor recognizes that the electronic device is converted from the second intermediate state to a third intermediate state based on a third angle obtained from the angle detecting sensor. A critical value (e.g., 135 degrees) that is a reference for determining the conversion to the third intermediate state may be fixed based on at least one of an FOV of the first illuminance sensor, a position of the first illuminance sensor, an FOV of the second illuminance sensor, a position of the second illuminance sensor, a screen size of the display, or a state of the electronic device.

In step 960, the processor activates the first illuminance sensor based on the conversion to the third intermediate state, and uses an illuminance value received from the first illuminance sensor to control the brightness of the display.

According to an embodiment, an electronic device includes a foldable housing, a display, a first illuminance sensor, at least one sensor, a processor, and a memory. The foldable housing may include a hinge structure; a first housing structure that is connected to the hinge structure and includes a first surface directed in a first direction and a second surface directed in a second direction opposite to the first direction; and a second housing structure that is connected to the hinge structure, includes a third surface directed in a third direction and a fourth surface directed in a fourth direction opposite to the third direction, and is folded about the hinge structure along with the first housing structure. The foldable housing has a structure in which the first surface faces the third surface in a folded state and the third direction is the same as the first direction in an unfolded state. The display extends from the first surface to the third surface, and includes a first portion on which the first surface is formed and a second portion on which the third surface is formed. The first illuminance sensor is disposed on the third surface of the second housing structure. The at least one sensor is configured to generate data for detecting an angle formed by the first surface and the third surface. The processor is operatively connected to the display, the first illuminance sensor, and the at least one sensor. The memory is operatively connected to the processor, and be configured to store a lookup table that includes a reference value for correcting a measurement value of the first illuminance sensor with respect to the angle formed by the first surface and the third surface. The memory stores instructions to cause the processor to determine the angle formed by the first surface and the third surface using the data from the at least one sensor during execution, to receive a first illuminance value from the first illuminance sensor, to correct the received first illuminance value based on the lookup table at least in part, and to control brightness of the display based on the corrected first illuminance value at least in part.

The at least one sensor may include a first motion sensor that is disposed in the first housing structure, and a second motion sensor that is disposed in the second housing structure. The first motion sensor and the second motion sensor may include an acceleration sensor and/or a gyro sensor.

The at least one sensor may include a sensor (an encoder sensor) that is attached to the hinge structure and is configured to detect the angle formed by the first surface and the third surface.

The electronic device may further include a second illuminance sensor that is disposed on the second surface or the fourth surface, and the instructions may enable the processor to receive a second illuminance value from the second illuminance sensor and to additionally correct the corrected first illuminance value based on the second illuminance value.

The instructions may instruct the processor to configure the brightness of the display to designated minimum brightness in a case where the angle formed by the first surface and the third surface is less than a first critical value (e.g., 30 degrees).

The instructions may instruct the processor to determine whether or not the angle formed by the first surface and the third surface is greater than a second critical value (e.g., 135 degrees) greater than the first critical value, and to determine whether or not to control the brightness of the display based on a result of the determination at least in part and the corrected first illuminance value.

The instructions may instruct the processor to control the brightness of the display based on the corrected first illuminance value when the angle formed by the first surface and the third surface is greater than the first critical value and is less than the second critical value, and to control the brightness of the display based on the illuminance value received from the first illuminance sensor when the angle is greater than or equal to the second critical value. The instructions may instruct the processor to configure a color of the first portion to a black color while the angle is less than the second critical value.

The instructions may instruct the processor to increase the brightness of the display in proportion to an increase in the angle after the brightness of the display is configured to the minimum brightness.

The instructions may instruct the processor to control the brightness of the display based on the corrected first illuminance value when the angle is greater than the first critical value while the brightness of the display is maintained as the minimum brightness.

The instructions may instruct the processor to turn off the display when the angle is less than a third critical value less than the first critical value, and to configure the brightness of the display to the minimum brightness and to turn on the display when the angle is greater than the third critical value.

The correction may be a process of replacing the first illuminance value with either an illuminance value received before the first illuminance value is received from the first illuminance sensor or a minimum illuminance value.

According to an embodiment, a method is provided for operating an electronic device including a foldable housing that causes first and second portions of a display to face each other in a folded state and to be directed in the same direction in an unfolded state and an illuminance sensor that is disposed on a surface on which the second portion is formed. The method includes determining an angle formed by the first portion and the second portion using data received from an angle detecting sensor; determining a reference value corresponding to the determined angle in a lookup table; correcting a first illuminance value from the illuminance sensor using the checked reference value; and controlling brightness of the display based on the corrected first illuminance value.

According to an embodiment, the memory may further store instructions to cause the processor to control the brightness of the display using an illuminance value obtained from the first illuminance sensor based on the structure in which the angle formed by the first surface and the third surface exceeds the critical value (e.g., the second critical value) during execution, and to control the brightness of the display using an illuminance value obtained from the second illuminance sensor based on the structure in which the angle is less than or equal to the critical value.

According to an embodiment, excessive screen brightness, based on brightness around the electronic device, can be prevented. Thus, unnecessary power consumption can be reduced, and eyestrain feeling of a user caused by an excessively bright screen in a dim environment can be reduced.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A mobile communication device, comprising:
   a housing including a first section and a second section coupled to each other such that an angle formed between the first section and the second section is adjustable;
   a flexible display at least partially housed in the first section and the second section;
   a first sensor that generates first data used to identify the angle;
   a second sensor that generates second data used to identify illuminance around the mobile communication device; and
   a processor operatively connected to the first sensor and the second sensor, and configured to:
   store, in a memory, first information indicating a plurality of angle ranges and second information indicating illuminances corresponding respectively to each of the plurality of angle ranges, the plurality of angle ranges including a first angle range, a second angle range in which a minimum value is greater than a maximum value of the first angle range, and a third angle range in which a minimum value is greater than a maximum value of the second angle range, and the illuminances including a first illuminance corresponding to the first angle range, a second illuminance corresponding to the second angle range and being a value less than the first illuminance, and a third illuminance corresponding to the third angle range and being a value less than the second illuminance,
   identify the angle formed between the first section and the second section based on the first data obtained from the first sensor,
   identify the illuminance based on the second data obtained from the second sensor while at least a part of the flexible display is activated,
   confirm, from the first information stored in the memory, an angle range to which the identified angle belongs,
   confirm, from the second information stored in the memory, illuminance corresponding to the confirmed angle range, wherein the confirmed illuminance is the first illuminance when the identified angle belongs to the first angle range, is the second illuminance when the identified angle belongs to the second angle range, and is the third illuminance when the identified angle belongs to the third angle range,
   determine whether the illuminance, which is identified based on the second data obtained from the second sensor, is greater than the illuminance confirmed from the second information stored in the memory,
   operate the flexible display at a first brightness when the identified illuminance is greater than the illuminance confirmed from the second information, and
   operate the flexible display at a second brightness, which is dimmer than the first brightness, when the identified illuminance is less than or equal to the illuminance confirmed from the second information,
   wherein the processor is configured to operate the flexible display at the second brightness by determining a correction value based on an influence of brightness of the first section on the second section, and determining the second brightness based on the correction value.

2. The mobile communication device of claim 1, wherein the processor is further configured to determine the mobile communication device as being in a low illuminance environment in response to the identified illuminance being less than or equal to the illuminance confirmed from the second information.

3. The mobile communication device of claim 1, wherein the housing further includes a folding section connected between the first section and the second section, and
   wherein the first sensor includes an encoder sensor that is at least partially housed in the folding section.

4. The mobile communication device of claim 1, wherein the first sensor includes a first sensor circuit housed in the first section, and a second sensor circuit housed in the second section,
   wherein the first sensor circuit is configured to sense a first characteristic corresponding to a motion of the mobile communication device,
   wherein the second sensor circuit is configured to sense a second characteristic corresponding to the motion of the mobile communication device, and
   wherein the first sensor unit is configured to generate the first data based on the first characteristic and the second characteristic.

5. The mobile communication device of claim 1, further comprising a third sensor capable of generating third data used to identify the illuminance,
   wherein the second sensor faces a first direction with respect to an outside of the mobile communication device, and the third sensor faces a second direction different from the first direction with respect to the outside, and wherein the processor is configured to perform the identifying of the illuminance based on the third data obtained from the third sensor.

6. A method for operating a mobile communication device, the mobile communication device comprising a housing including a first section and a second section coupled to each other such that an angle formed between the first section and the second section is adjustable, a flexible display at least partially housed in the first section and the second section, a first sensor that generates first data used to identify the angle, a second sensor that generates second data used to identify illuminance around the mobile communication device, and a memory, the method comprising:

storing, in the memory, first information indicating a plurality of angle ranges and second information indicating illuminances corresponding respectively to each of the plurality of angle ranges, the plurality of angle ranges including a first angle range, a second angle range in which a minimum value is greater than a maximum value of the first angle range, and a third angle range in which a minimum value is greater than a maximum value of the second angle range, and the illuminances including a first illuminance corresponding to the first angle range, a second illuminance corresponding to the second angle range and being a value less than the first illuminance, and a third illuminance corresponding to the third angle range and being a value less than the second illuminance;

identifying the angle formed between the first section and the second section based on the first data obtained from the first sensor;

identifying the illuminance based on the second data obtained from the second sensor while at least a part of the flexible display is activated;

confirming, from the first information stored in the memory, an angle range to which the identified angle belongs;

confirming, from the second information stored in the memory, an illuminance corresponding to the confirmed angle range, wherein the confirmed illuminance is the first illuminance when the identified angle belongs to the first angle range, is the second illuminance when the identified angle belongs to the second angle range, and is the third illuminance when the identified angle belongs to the third angle range;

determining whether the illuminance, which is identified based on the second data obtained from the second sensor, is greater than the illuminance confirmed from the second information stored in the memory;

operating the flexible display at a first brightness when the identified illuminance is greater than the illuminance confirmed from the second information;

operating the flexible display at a second brightness, which is dimmer than the first brightness, when the identified illuminance is less than or equal to the illuminance confirmed from the second information; and operating the flexible display at the second brightness by determining a correction value based on an influence of brightness of the first section on the second section and determining the second brightness based on the correction value.

7. The method of claim 6, further comprising:
determining the mobile communication device as being in a low illuminance environment in response to the identified illuminance being less than or equal to the illuminance confirmed from the second information.

8. The method of claim 6,
wherein the mobile communication device further comprises a third sensor capable of generating third data used to identify the illuminance,
wherein the second sensor faces a first direction with respect to an outside of the mobile communication device,
wherein the third sensor faces a second direction different from the first direction with respect to the outside, and
wherein the method further comprises identifying the illuminance based on the third data obtained from the third sensor.

* * * * *